Figure 1:
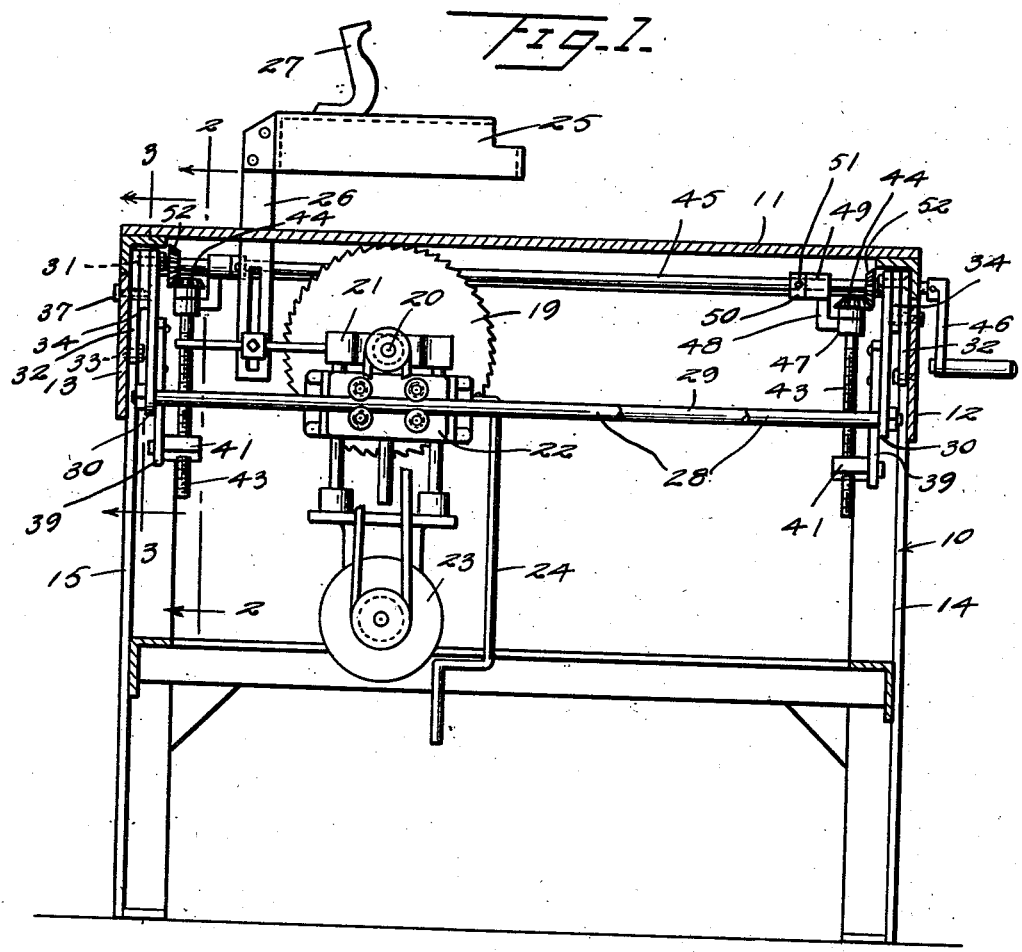

June 29, 1943.   G. J. SELLMEYER   2,323,247
SUSPENSION MEANS FOR RECIPROCAL SAWS
Filed May 5, 1941   2 Sheets-Sheet 1

Inventor
G. J. Sellmeyer
By Kimmel & Crowell
Attorneys

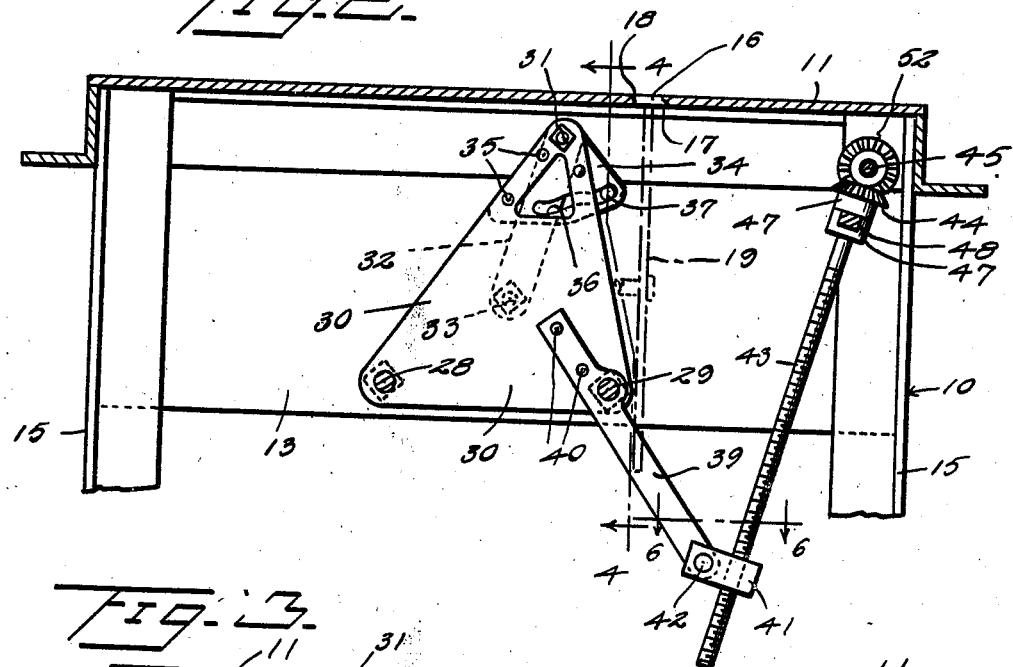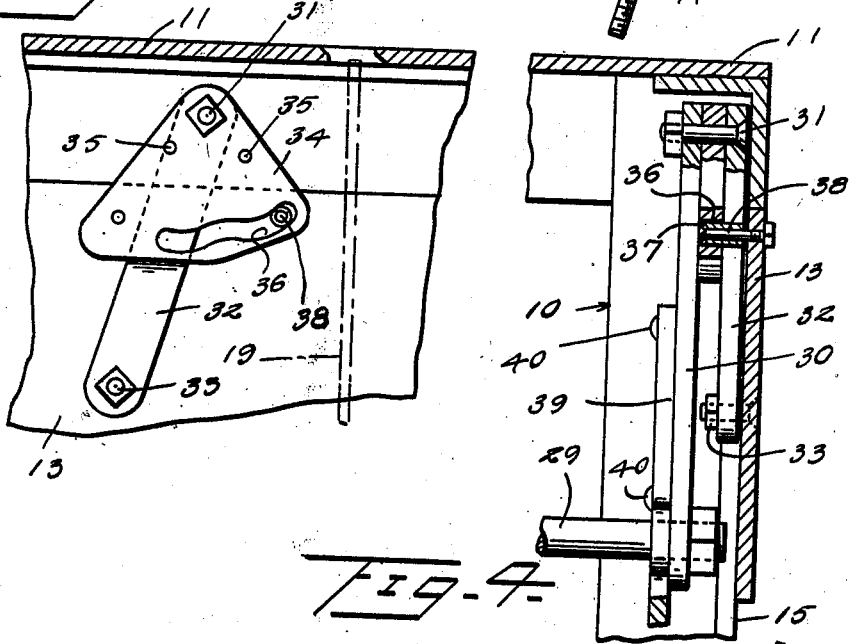

Patented June 29, 1943

2,323,247

UNITED STATES PATENT OFFICE 2,323,247

SUSPENSION MEANS FOR RECIPROCAL SAWS

Gilbert J. Sellmeyer, Indianapolis, Ind.

Application May 5, 1941, Serial No. 391,971

6 Claims. (Cl. 143—6)

This invention relates to portable saws, and is an improvement over the portable saw embodied in my copending application Ser. No. 329,776, filed April 15, 1940.

An object of this invention is to provide an improved suspension means for a movable saw and saw carriage so that the saw and saw carriage may be swung to any desired angular position relative to the table without affecting the width of the saw slot.

Another object of this invention is to provide in a portable saw including a movable saw carriage, a swingable carriage suspension means which is so constructed that a fairly narrow saw slot may be provided in the saw table.

A further object of this invention is to provide a swingable suspension means for a saw carriage which is shiftable lengthwise of a saw slot wherein the suspension means is so mounted and constructed that it may shift laterally coactive with the swinging thereof in order to maintain the saw blade within the saw slot in any angular position of the saw blade.

To the foregoing objects and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

Figure 5:
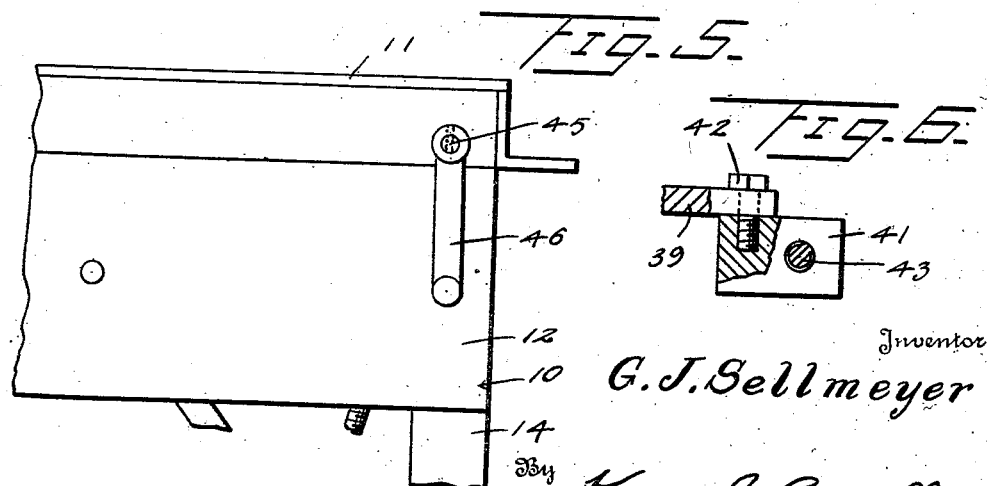
Figure 6:
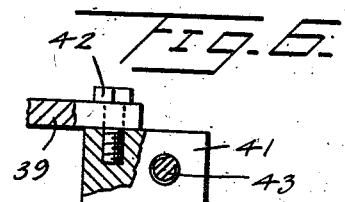

In the drawings:

Figure 1 is a vertical section of a portable saw structure embodying this invention, Figure 2 is a sectional view taken on the line 2—2 of Figure 1, Figure 3 is a fragmentary sectional view taken on the line 3—3 of Figure 1, Figure 4 is a fragmentary sectional view taken on the line 4—4 of Figure 2, Figure 5 is a fragmentary front elevation of the saw frame structure, and Figure 6 is a fragmentary sectional view taken on the line 6—6 of Figure 2.

Referring to the drawings the numeral 10 designates generally a frame structure having mounted on the upper end thereof a saw table 11. The frame structure 10 includes front and rear vertically disposed plates 12 and 13, which are fixed to the front and rear legs 14 and 15 of the frame structure 10.

The saw table 11 is provided with a longitudinally extending saw slot 16, which as shown in Figure 2, has the outer marginal edge thereof disposed on an angle as at 17. The inner marginal edge of the slot 16 is rounded or angled, as at 18, and a circular saw 19 is adapted to move lengthwise of the slot 16 and as will be hereinafter described is adapted to be positioned either perpendicular to the table 11 or at a selected angle with respect to the table 11. The saw 19 is mounted on a saw arbor 20 rotatably carried by an arbor support 21, which is vertically adjustable in an arbor or saw carriage 22. A motor 23 is supported in depending relation from the carriage 22 and is adapted to be connected to a suitable source of electric current supply. The vertical adjustment of the saw 19 is obtained by means of a crank 24, which is connected with an arbor adjusting means, as set forth in detail in my copending application Ser. No. 329,776.

A guard member 25 is carried by a vertically adjustable support 26, which is carried by the arbor supporting member 21, and a handle 27 is secured to the guard 25 so that the carriage 22 with the saw 19 may be moved lengthwise of the saw slot 16.

The carriage 22 is movably mounted on a pair of rails 28 and 29 which are disposed in spaced apart parallel relation and are secured at their opposite ends to a pair of triangularly shaped end plates 30. The end plates 30 are of like construction and each end plate 30 has pivotally connected with the upper end thereof, as at 31, the upper end of a plate supporting link 32. The lower end of the link 32 is pivotally secured as at 33 to the inner side of an end plate 13. A cam plate 34 of substantially triangular configuration is fixed as by fastening devices 35 to the outer side of an end plate 30, and the cam plate 34 has formed therein a cam track 36. A roller 37 which is rotatably carried by a pivot member 38 fixed to the end plate 13 engages in the cam track 36.

In order to provide a means whereby the track supporting plates 30 may be swung on the pivot members 31 and the links 32 rocked on the pivot member 33 to thereby not only swing the plates 30 on the pivot 31, but also to shift the end plates 30 laterally, there is secured to each end plate a downwardly and outwardly inclined arm or lever 39. The arm 39 is secured to an end plate 30 by fastening devices 40. The lower end of the arm or lever 39 has pivotally secured thereto a nut or threaded block 41.

A pivot member 42 connects the block or nut 41 with the lower end of the arm or lever 39. A downwardly and inwardly inclined threaded shaft 43 is threaded through the block or nut 41 and has secured to the upper outer end thereof a bevel gear 44. A horizontally disposed operating shaft 45 is journalled in the frame structure 10 beneath the table 11 and has fixed to the forward end thereof a crank member 46. A bearing 47 engages about the shaft 43 and is carried by an L-shaped bearing supporting arm 48. A second bearing 49 is carried by the supporting arm 48 and engages about the shaft 45.

A collar 50 is adjustably secured as by a set screw 51 to the shaft 45 and engages against the bearing 49 so as to hold the bevel gear 44 in mesh with a second bevel gear 52. The second bevel gear 52 is fixed to the shaft 45. There are two of these shafts 43 which are threaded oppositely and two gears 44 and 52 adjacent each end of the frame structure 10 so that both ends of the two tracks 28 and 29 will be adjusted by rotation of the shaft 45.

In the use and operation of this device, the saw 19 is operated from the motor 23 and is vertically adjustable with respect to the table 11 by means of the adjusting crank 24. The carriage 22 is adapted to be moved lengthwise of the tracks 28 and 29 by pull or push on the handle 27. Where a right angle cut is to be made in the work the saw will be disposed in the position shown in Figure 2 and will be raised above the top surface of the table 11 to the desired degree. In the event it is desired to dispose the saw 19 on an angle other than a right angle with respect to the plane of the table 11, the crank 46 is turned so as to thereby pull the threaded block 41 upwardly. The upward pull on the block 41 will rock the two end levers 39 and the end plates 30. Simultaneously with the rocking of the end plates 30 on the upper link pivots 31, the end plates 30 will be shifted laterally with the cam plate 34 moving over the roller 37. The cam track 36 of the cam plate 34 is so formed as to provide for the maintaining of the circular saw 19 within the slot 16 during any angular position of the saw 19.

With a construction of this kind it is not necessary to provide a wide saw slot nor is it necessary to provide for one portion of the saw table to be adjustable in order to widen the saw slot to accommodate the saw in its angularly adjusted position. When the suspension means hereinbefore described has been adjusted to the desired or selected position, the carriage 22 may be moved lengthwise of the frame structure 10 along the tracks 28 and 29, so as to move the saw 19 lengthwise of the saw slot 16. A saw structure including a suspension means of this kind will permit either right angled or mitred cuts being made in the work depending on the adjustment of the end plates 30 through the operation of the adjusting crank 46.

What I claim is:

1. In a portable saw including a frame, a saw table on the frame having an elongated saw slot, a circular saw movable lengthwise of the slot and a saw carriage for the saw; a carriage suspension for supporting the carriage and saw at a selected inclination with respect to the work engaging on the table, said suspension comprising a pair of end plates, carriage supporting tracks carried by said end plates, means supporting said plates for combined swinging and lateral movement whereby to maintain said saw within said slot at the selected inclination thereof, said supporting means including a cam plate fixed to each end plate and formed with a cam track, links pivotally secured to said frame and said end plates whereby said end plates may swing on said links and shift laterally with the swinging of said links, a roller for each cam track carried by said frame, and manually operable means for adjusting said end plates.

2. In a portable saw including a frame, a saw table on the frame having an elongated saw slot, a circular saw movable lengthwise of the slot and a saw carriage for the saw; a carriage suspension for supporting the carriage and saw at a selected inclination with respect to the work engaging on the table, said suspension comprising a pair of end plates, carriage supporting tracks carried by said end plates, means supporting said plates for combined swinging and lateral movement whereby to maintain said saw within said slot at the selected inclination thereof, said supporting means including a cam plate fixed to each end plate and formed with a cam track, links pivotally secured to said frame and said end plates whereby said end plates may swing on said links and shift laterally with the swinging of said links, a roller for each cam track carried by said frame, a threaded nut pivotally connected with an end plate, a threaded shaft engaging said nut, and means for rotating said shaft.

3. In a portable saw including a frame, a saw table on the frame having an elongated saw slot, a circular saw movable lengthwise of the slot and a saw carriage for the saw; a carriage suspension for supporting the carriage and saw at a selected inclination with respect to the work engaging on the table, said suspension comprising a pair of end plates, carriage supporting tracks carried by said end plates, means supporting said plates for combined swinging and lateral movement whereby to maintain said saw within said slot at the selected inclination thereof, said supporting means including a cam plate fixed to each end plate and formed with a cam track, links pivotally secured to said frame and said end plates whereby said end plates may swing on said links and shift laterally with the swinging of said links, a roller for each cam track carried by said frame, an arm fixed to each end plate, a threaded nut pivotally carried by said arm, a threaded shaft engaging said nut, and means for rotating said shaft.

4. In a portable saw including a frame, a saw table on the frame having an elongated saw slot, a circular saw movable lengthwise of the slot and a saw carriage for the saw; a carriage suspension for supporting the cariage and saw at a selected inclination with respect to the work engaging on the table, said suspension comprising a pair of end plates, carriage supporting tracks carried by said end plates, means supporting said plates for combined swinging and lateral movement whereby to maintain said saw within said slot at the selected inclination thereof, said supporting means including a cam plate fixed to each end plate and formed with a cam track, links pivotally secured to said frame and said end plates whereby said end plates may swing on said links and shift laterally with the swinging of said links, a roller for each cam track carried by said frame, an arm fixed to each end plate and extending downwardly and outwardly therefrom, a threaded nut pivotally carried by each arm, an operating shaft rotatably carried by said frame, a pair of bevel gears fixed to said shaft, a threaded shaft for each nut and inclined downwardly from said operating shaft, a bevel gear carried by the upper end of each threaded shaft meshing with said first gears, swingable bearing means connected with said operating and threaded shafts, and a crank fixed to said operating shaft.

5. A saw carriage suspension for mounting on a saw table frame comprising a pair of end plates, carriage supporting tracks carried by said end plates, means supporting said plates for combined swinging and lateral movement whereby to angularly adjust the carriage relative to the table, said supporting means including a pair of cam plates, means securing said cam plates to the outer side of each end plate and formed with a cam track, links pivotally secured to said frame and said end plates whereby said end plates may swing on said links and shift laterally with the swinging of said links, a roller for each cam track carried by said frame, and means for adjusting said end plates.

6. A saw carriage suspension for mounting on a saw table frame comprising a pair of end plates, carriage supporting tracks carried by said end plates, means supporting said plates for combined swinging and lateral movement whereby to angularly adjust the carriage relative to the table, said supporting means including a pair of cam plates, means securing said cam plates to the outer side of each end plate and formed with a cam track, links pivotally secured to said frame and said end plates whereby said end plates may swing on said links and shift laterally with the swinging of said links, a roller for each cam track carried by said frame, an arm fixed to each end plate and extending therefrom, a threaded nut carried by each arm, and manually operable threaded means engaging said nuts for angularly adjusting said end plates.

GILBERT J. SELLMEYER.